(12) United States Patent
Zuo et al.

(10) Patent No.: US 12,515,710 B2
(45) Date of Patent: Jan. 6, 2026

(54) OPERATIONAL WEATHER MANAGEMENT

(71) Applicant: FORD GLOBAL TECHNOLOGIES, LLC, Dearborn, MI (US)

(72) Inventors: Lin Zuo, Redwood City, CA (US); Shenglong Gao, Miami, FL (US); Bradley Dryer, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 334 days.

(21) Appl. No.: 18/161,231

(22) Filed: Jan. 30, 2023

(65) Prior Publication Data

US 2024/0017744 A1    Jan. 18, 2024

Related U.S. Application Data

(60) Provisional application No. 63/389,112, filed on Jul. 14, 2022.

(51) Int. Cl.
*B60W 60/00* (2020.01)

(52) U.S. Cl.
CPC ... *B60W 60/00182* (2020.02); *B60W 2555/20* (2020.02)

(58) Field of Classification Search
None
See application file for complete search history.

(56) References Cited

U.S. PATENT DOCUMENTS

| | | | | |
|---|---|---|---|---|
| 11,851,089 | B1* | 12/2023 | Hinojosa | B60W 40/02 |
| 2002/0067289 | A1* | 6/2002 | Smith | G08G 1/0962 |
| | | | | 340/905 |
| 2022/0153258 | A1* | 5/2022 | Arechiga-Gonzalez | |
| | | | | G08G 1/147 |
| 2024/0230370 | A1* | 7/2024 | Kapil | G08G 1/0133 |

OTHER PUBLICATIONS

Grant, "Seeing in the rain—how good in your AV's sensor performance?", Autonomous Vehicle International, May 29, 2022, available at https://www.autonomousvehicleinternational.com/features/seeing-in-the-rain-how-good-is-your-avs-sensor-performance.html (5 pages).
Perrone, "How Will Self-Driving Cars Fare in Bad Weather?", Endurance, Jan. 28, 2021, available at https://www.endurancewarranty.com/learning-center/tech/self-driving-cars-bad-weather/ (8 pages).

* cited by examiner

*Primary Examiner* — Hitesh Patel
*Assistant Examiner* — Wenyuan Yang
(74) *Attorney, Agent, or Firm* — Frank MacKenzie; Brooks Kushman, P.C.

(57) ABSTRACT

This document discloses system, method, and computer program product embodiments for operational weather management. For example, the method includes operating a fleet of autonomous vehicles within a geographical region, the fleet of autonomous vehicles performing one or more missions. The method further includes receiving a weather alert including a prediction of inclement weather, the weather alert including a predicted onset time and a predicted duration of the inclement weather. The method further includes analyzing the weather alert to determine actions for vehicles of the fleet to perform, wherein the actions include parking in a nearby location in the geographical region or returning to a base of operations. The method further includes, in response to the analysis, transmitting, to the vehicles of the fleet, a weather advisory, causing each of the vehicles to perform at least one of the actions.

20 Claims, 9 Drawing Sheets

OPERATIONAL WEATHER MANAGEMENT

CROSS-REFERENCE TO RELATED APPLICATIONS

The present application claims priority to U.S. Provisional Patent Application 63/389,112, filed Jul. 14, 2022.

BACKGROUND

Autonomous vehicles (AVs) may combine a variety of sensors to perceive their surroundings, such as thermographic cameras, radar, lidar, sonar, GPS, odometry and inertial measurement units. Advanced control systems interpret sensory information to identify appropriate navigation paths, as well as obstacles and relevant signage, and operate the AV with little or no human input. However, AV sensors may become less capable when operating during periods of inclement weather. For example, camera images may become distorted and LIDAR range may decrease. But idling a fleet of autonomous vehicles at the first hint of an impending weather event would result in inefficient use of resources and loss of revenue, especially for entities that operate large fleets of AVs for ride-sharing, delivery, or other services. More effective means of managing autonomous vehicles in the face of potential weather events are needed.

This document describes methods and systems that are directed to addressing the problems described above, and/or other issues.

SUMMARY

At least some of the problems associated with the existing solutions will be shown solved by the subject matter of the independent claims that are included in this document. Additional advantageous aspects are discussed in the dependent claims.

In a first set of embodiments, a method of managing a fleet of autonomous vehicles is disclosed. The method includes operating a fleet of autonomous vehicles within a geographical region, the fleet of autonomous vehicles performing one or more missions. The method further includes receiving a weather alert including a prediction of inclement weather, the weather alert including a predicted onset time and a predicted duration of the inclement weather. The method further includes analyzing the weather alert to determine one or more actions for one or more vehicles of the fleet of autonomous vehicles to perform, wherein the one or more actions include parking in a nearby location in the geographical region or returning to a base of operations. The method further includes, in response to the analysis, transmitting, to the one or more vehicles of the fleet of autonomous vehicles, a weather advisory, causing each of the one or more vehicles to perform at least one of the one or more actions.

In other embodiments, a system for operating a fleet of autonomous vehicles within a geographical region (the fleet of autonomous vehicles performing one or more missions) includes a memory and at least one processor coupled to the memory and configured to receive multiple weather alerts over time. Each of the multiple weather alerts includes a prediction of inclement weather, and each weather alert includes a predicted onset time and a predicted duration of the inclement weather. The at least one processor is further configured to track, over the multiple weather alerts, one or more metrics related to operational weather management of the fleet of autonomous vehicles. For each of the multiple alerts, the processor is further configured to analyze the weather alert and the one or more tracked metrics to determine one or more actions for one or more vehicles of the fleet of autonomous vehicles to perform, wherein the one or more actions include parking in a nearby location in the geographical region or returning to a base of operations. In response to the analysis, the at least one processor is further configured to transmit, to the one or more vehicles of the fleet of autonomous vehicles, a weather advisory, causing each of the one or more vehicles to perform at least one of the one or more actions.

In other embodiments, a non-transitory computer-readable medium is disclosed. The non-transitory computer-readable medium stores instructions that, when executed by at least one computing device, will cause the at least one computing device to perform operations. The operations include operating a fleet of autonomous vehicles within a geographical region (the fleet of autonomous vehicles performing one or more missions). The operations further include receiving a weather alert including a prediction of inclement weather, the weather alert including a predicted onset time and a predicted duration of the inclement weather. The operations further include analyzing the weather alert to determine one or more actions for one or more vehicles of the fleet of autonomous vehicles to perform, wherein the one or more actions include parking in a nearby location in the geographical region or returning to a base of operations. The operations further include, in response to the analysis, transmitting, to the one or more vehicles of the fleet of autonomous vehicles, a weather advisory, causing each of the one or more vehicles to perform at least one of the one or more actions.

The methods described above may be embodied in a system including a processor and memory containing programming instructions that, when executed, will cause the processor to implement the actions described above. Various embodiments also include a computer program product that contains such programming instructions, and a memory containing the computer program product.

BRIEF DESCRIPTION OF THE DRAWINGS

The accompanying drawings are incorporated into this document and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
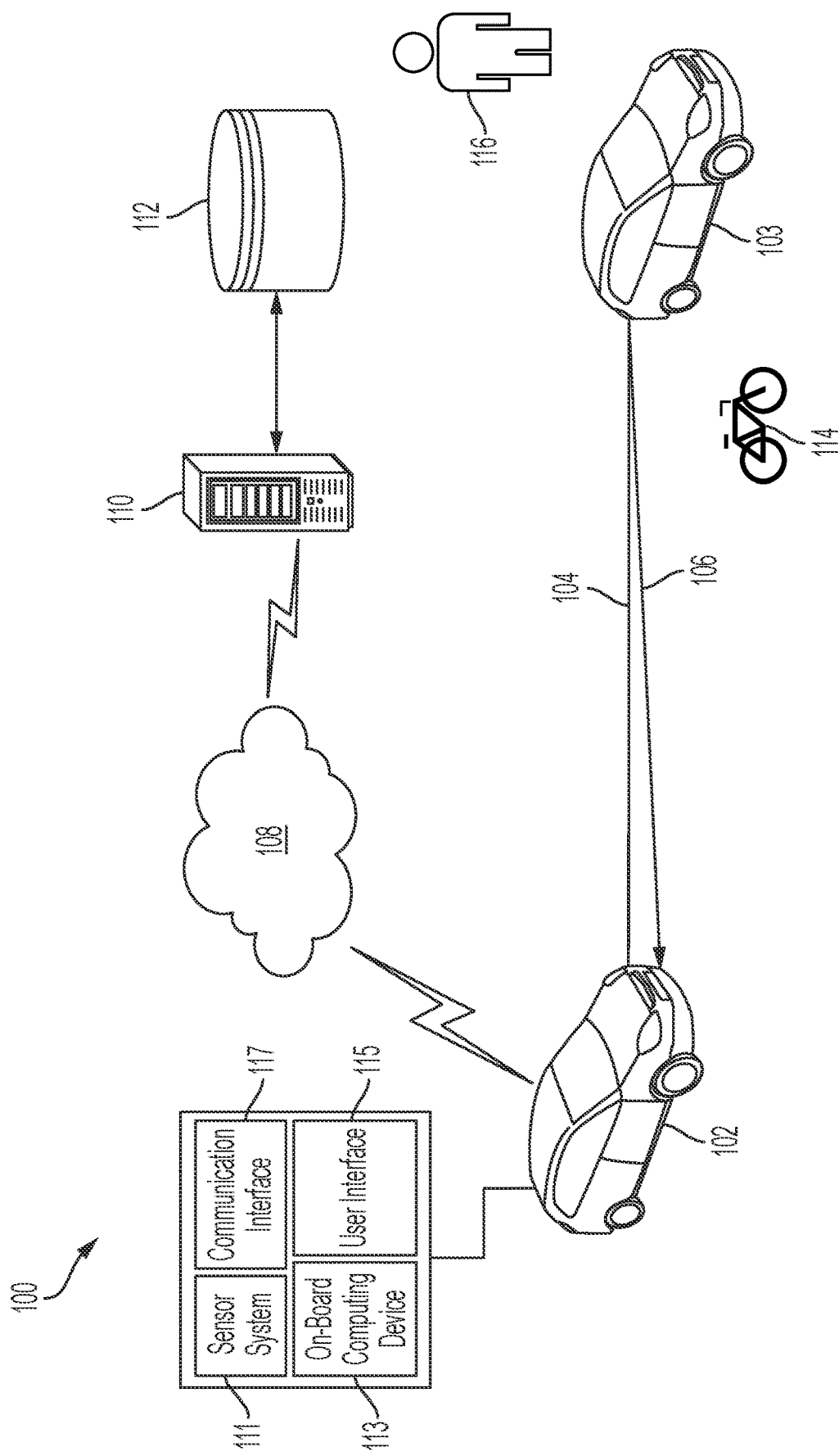
FIG. 1 illustrates an example autonomous vehicle system, in accordance with aspects of the disclosure.

This document describes system, apparatus, device, method and/or computer program product embodiments, and/or combinations and sub-combinations of any of the above, for managing a fleet of autonomous vehicles (AVs) in the face of potential weather events. A fleet of AVs may perform a variety of missions, including (but not limited to) ride-sharing or goods-delivery missions, vehicle-testing missions, mapping missions, personnel-training missions, and so forth (including combinations of any or all of these types of missions). Commercial missions may include transporting passengers or goods (such as meals) over short or long distances for hire. Vehicle-testing missions may include testing new or enhanced sensors and/or sensor configurations, new or enhanced software algorithms, etc. Personnel-training missions may include missions for obtaining or maintaining experience with or qualifications to perform roles associated with, e.g., operating AVs. Qualifications may include, e.g., a certification to participate in one or more types of AV missions, such as a vehicle-testing mission. Other missions may include mapping missions, including obtaining sensor data for the geographical region within which the AVs may operate, or model-training missions, e.g., obtaining sensor data for training (or further training) one or more machine-learning models to improve the predictive capability of the machine-learning model(s).

However, AVs may become less capable during inclement weather, and, therefore, their ability to perform assigned missions may become compromised. For example, sensors (or other components of an AV's perception system) may be negatively affected by rain or snow, decreasing the AV's ability to sense objects in the environment. In some cases, this reduction in capability may require the AV to enter a low-risk operating mode and/or be brought to a complete stop until its capability is restored (e.g., until the perception system(s) return to a sufficient level of functionality). The need to come to a complete stop (e.g., enter a minimal risk condition to avoid negative outcomes) may adversely affect the AV's mission schedule.

Extended delays during a mission, e.g., while delivering warm meals (or other time-sensitive goods) or ferrying human passengers, may cause particular inconvenience and/or otherwise frustrate the purpose of the mission. On the other hand, preemptively curtailing operations of the AV fleet at the first inkling of a weather event may have an adverse effect on the overall capability of the fleet to perform scheduled missions. Effectively managing a fleet of AVs in the face of potential weather events requires a balance that reduces the negative effects of overreacting and underreacting.

The present disclosure includes systems and methods for effectively managing a fleet of AVs in the face of potential weather events and further includes systems and methods for continually collecting information to further optimize the balance between overreacting and underreacting in the face of potential weather events.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Definitions for additional terms that are relevant to this document are included at the end of this Detailed Description.

FIG. 1 illustrates an example system 100, in accordance with aspects of the disclosure. System 100 comprises a vehicle 102 that is traveling along a road in a semi-autonomous or autonomous manner. Vehicle 102 is also referred to in this document as AV 102. AV 102 can include, but is not limited to, a land vehicle (as shown in FIG. 1), an aircraft, or a watercraft. As noted above, except where specifically noted this disclosure is not necessarily limited to AV embodiments, and it may include non-autonomous vehicles in some embodiments.

AV 102 is generally configured to detect objects in its proximity. The objects can include, but are not limited to, a vehicle 103, cyclist 114 (such as a rider of a bicycle, electric scooter, motorcycle, or the like) and/or a pedestrian 116.

As illustrated in FIG. 1, the AV 102 may include a sensor system 111, an on-board computing device 113, a communications interface 117, and a user interface 115. Autonomous vehicle system 100 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

The sensor system 111 may include one or more sensors such as, without limitation, a lidar system, a radar system, a LADAR system, a sonar system, one or more cameras (for example, visible spectrum cameras, infrared cameras, monocular cameras, stereo cameras, depth cameras, etc.), temperature sensors, position sensors (for example, a global positioning system (GPS), etc.) and the like. The system also may include other sensors that do not directly detect objects, such as location sensors, fuel sensors, humidity sensors, occupancy sensors, and sensors that detect motion of the vehicle (for example, an inertial measurement unit (IMU), etc.). The data captured by these sensors can include information that describes the location of objects within the surrounding environment of the AV 102, information about the environment itself, information about the motion of the AV 102, information about a route of the vehicle, or the like. As AV 102 travels over a surface, at least some of the sensors may collect data pertaining to the surface. This document may refer to such data interchangeably as "perception data" or "object detection data."

The AV 102 may also communicate sensor data collected by the sensor system 111 to a remote computing device 110 (for example, a cloud processing system) over communications network 108. Remote computing device 110 may be configured with one or more servers to process one or more processes of the technology described in this document. Remote computing device 110 may also be configured to communicate data/instructions to/from AV 102 over network 108, to/from server(s) and/or database(s) 112.

If the object detection system is a lidar or radar system, then the object detection system may be configured to transmit a pulse 104 to detect objects located within a distance or range of distances of AV 102. The transmitted pulse 104 may be a light pulse from a lidar system, a sonic pulse from a sonar system, a laser pulse from a LADAR system, or other types of pulses that are available from the object detection system. Transmitted pulse 104 may be incident on one or more objects (such as vehicle 103, bicycle 114, or pedestrian 116) and be reflected back to the lidar system. Reflected pulse 106 incident on the system may be processed to determine a distance of that object 103, 114, 116 to AV 102. The reflected pulse may be detected using, in in the case of light pulses, a photodetector or array of photodetectors positioned and configured to receive the light reflected back into the lidar system. In the case of a radar system, the radar emitter emits radio frequency energy, and a radar detector such as an antenna detects the energy after the energy is reflected back from the object. Detected object data is communicated from the object detection system to an on-board computing device, such as on-board computing device 113 of FIG. 1. The AV 102 may also communicate object detection data to a remote computing device 110 over communications network 108.

It should be noted that the object detection systems may be included in systems other than the AV 102 such as, without limitation, other vehicles (autonomous or driven), robots, satellites, etc.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102 and external systems, such as, for example, external devices, sensors, other vehicles, servers, data stores, databases, etc. The communications interface 117 may utilize any now or hereafter known protocols, protection schemes, encodings, formats, packaging, etc. such as, without limitation, Wi-Fi, an infrared link, Bluetooth, that of a mobile network (such as 3G, 4G, 5G or the like), etc. The user interface system 115 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 117 over communication links such as those known as vehicle-to-vehicle, vehicle-to-object or other V2X communication links. The term "V2X" refers to a communication between a vehicle and any object that the vehicle may encounter or affect in its environment.

Potential adverse weather may present unique challenges to managing a fleet of autonomous vehicles. In some examples, the fleet operates within a geographical region, such as the public streets of a metropolitan area where autonomous vehicles are approved to operate. In some examples, the fleet is constrained to operate within the streets of, e.g., a privately owned park or other amusement area. At any point in time, vehicles of the fleet may be performing a variety of missions across the geographical region. Missions may be related to improving the capability of the fleet (or of individual vehicles). Missions may include testing new or improved machine-learning or other software systems, or testing improved sensor and/or perception systems. Missions may also include acquiring data to be used to create or update maps of the geographical region (or one or more an areas within the region). In some examples, missions include delivering passengers and/or goods from place to place—either over short distances, such as within a city or even within a smaller region, such as within a theme park—or over longer distances, such as with inter-city trucking. In the latter case, the fleet may operate over a continental geographical region.

Inclement weather may negatively affect an AV's capability, e.g., by interfering with the AV's sensors and/or perception system. Such a reduction in capability may require the AV to slow or stop, e.g., to assume a Minimal Risk Condition (MRC) until the AV regains capability (e.g., as the inclement weather abates). In a worst case, the AV may slow or stop abruptly, e.g., in the middle of the road, as the performance of its perception systems degrades below a reasonable operating threshold. This may cause disruption to the AV's scheduled missions and may have outsized impact on particular missions in progress, such as delivering passengers or hot meal, short-lived radioisotopes, or other time-sensitive goods. To avoid disrupting missions in progress, AV fleet managers may terminate missions when they become aware of imminent inclement weather and avoid undertaking new missions while the threat of potential inclement weather persists. However, an overly cautious approach may lead to missed economic opportunities and/or inefficient overall utilization of the AV fleet. A middle ground, which only "grounds" an operational AV fleet when the risk of inclement weather exceeds a threshold may reasonably trade off the risk of disruption to missions in progress vs. the risk of missed opportunities. Furthermore, by continually collecting relevant information on the effectiveness of fleet management, the parameters may be continually (or periodically) refined over time, leading to greater efficiencies.

Figure 2:
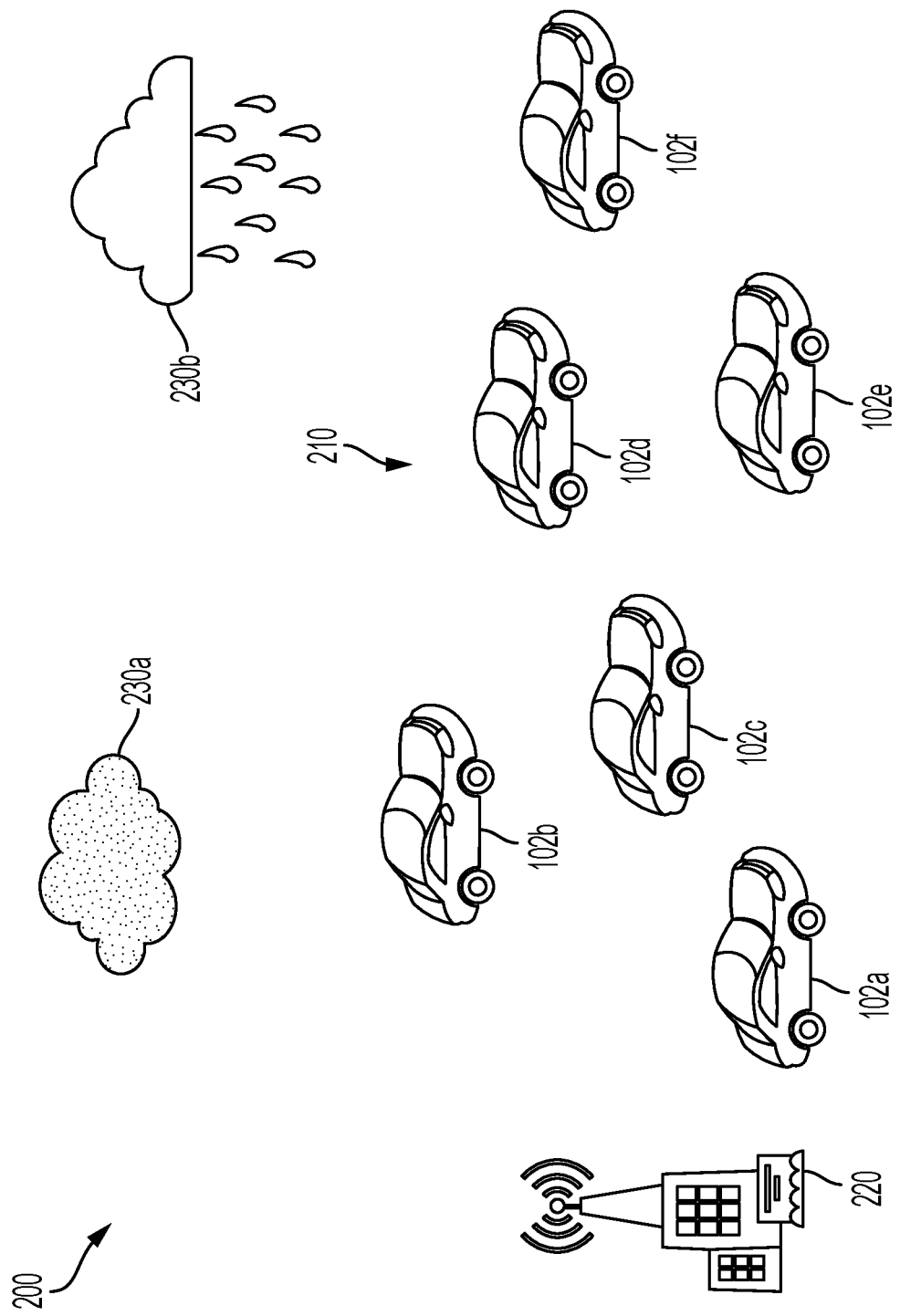
FIG. 2 illustrates an example environment for managing a fleet of AVs.

FIG. 2 illustrates an example environment 200 for a fleet 210 of AVs 102, 102a-f. The fleet 210 may include automobiles, robotic vehicles, aerial drones, or other vehicle capable of autonomous or semiautonomous operations and which can be remotely monitored. The AVs 102 may include taxis transporting passengers, delivery vehicles transporting goods, vehicles performing testing, training, and/or mapping, etc. In some examples, the AVs 102 include human operators who are prepared to assume control of the vehicle 102 when necessary. The human operators may been trained and/or may possess appropriate credentials or qualifications to perform the role of operator. In some examples, fleet manager(s) and/or operators monitor the AVs 102 from a remote base of operations 220. The example environment 200 includes weather conditions 230, which may affect the capability of the AVs 102. Weather conditions may include imminent precipitation 230a (e.g., a threat of rain, sleet, and/or snow), or active precipitation 230b.

In some examples, fleet management is performed according to discrete, scheduled periods of time, e.g., for the convenience of operators and/or fleet managers. For example, a day may include a morning shift and an afternoon shift of AV 102 operation. The fleet may be based in one or more centralized locations. For example, AVs which perform long-haul delivery of goods, e.g., between cities may have a base of operations 220 in each of several cities. AVs which operate in a small geographical region, such as AVs which ferry passengers around an amusement park, may have only a single base of operations 220. In some examples, the entire fleet 210 starts from the centralized base(s) of operations 220 at the beginning of each shift and returns to the centralized base(s) of operations 220 at the end of each shift. The fleet 210 may have an associated set of missions to perform during each scheduled period of time (e.g., shift). The missions may include customer-facing missions, such as transporting passengers or goods for hire. The missions may also include development-related missions, such as performing mapping, software or hardware (e.g., sensor) testing, and/or training activities. The missions may be short in duration, such that several missions may be performed during a shift, or the missions may last for an entire shift, such as testing new software, or transporting goods over long distances. Missions may have an associated estimated duration of time to complete performance of the mission. For example, a mission to transport a passenger or deliver goods to a requested destination may include an estimated duration based on pickup and drop-off points and knowledge of the route and likely traffic conditions between those points.

AVs may become less capable during inclement weather conditions 230b. For example, sensors (or other components of an AV's perception system) may be negatively affected by rain or snow, decreasing the AV's ability to sense objects in the environment. Thus, inclement weather 230b may impede the ability of the AV 102 to perform its mission. Furthermore, the weather may become sufficiently severe to exceed conditions the AV 102 is designed to operate under. In this situation, the AV 102 may require a human operator to assume control. If no human operator is available (e.g., if all remote operators are already assisting other AVs 102), the AV 102 may be forced to suspend operation until conditions improve. An abrupt or unmanaged cessation of operation may cause a variety of hardships. For example, a stopped AV 102 may impede progress of other vehicles 103 in the environment. Furthermore, an AV 102 that has stopped during the process of transporting a paying customer to a destination may severely inconvenience the customer. To avoid such negative consequences, a fleet manager may proactively instruct the fleet 210 to cease operation in an orderly fashion prior to the onset of inclement weather 230b. For example, the fleet manager may receive an alert (or other form of early indication) that inclement weather may be imminent. The alert may come from a government service, such as the U.S. National Weather Service, and/or may come from any of several commercial source of weather alerts, e.g., a service which offers weather-alert subscription services, or other source that provides advance warning of inclement weather (e.g., rain, sleet, snow, etc.). The alert may be in the form of one or more messages including information about the predicted inclement weather, including the type of weather (e.g., rain, sleet, snow, thundershowers, hurricanes, tornadoes, etc.), the predicted severity and/or duration of the inclement weather, the area or areas most likely to be affected during the duration of the inclement weather, etc. The alert may also include probabilities for any and all of the above. For example, the alert may include a probability that each of several areas within a geographical region will be subject to inclement weather and/or subject to inclement weather of a threshold intensity. The alert may be transmitted to the fleet manager through text message, e-mail, or other form of communication. In some examples, the weather alert is broadcast to multiple recipients. For example, the weather alert may be broadcast to all subscribers to a weather alert service, or all communication devices within a threshold distance of the weather-alert provider. In some examples, the fleet manager receives the weather alert via a web page of the weather-alert provider or other forum that is accessible to the fleet manager. The fleet manager may monitor or periodically query the forum for the existence of a weather alert indicating potentially inclement weather.

Frequently and/or prematurely curtailing operation may result in lost economic opportunity. Therefore, the disclosed centralized and systematic approach to fleet management balances the negative effects (e.g., lost economic opportunity) of overreacting to the threat of inclement weather 230b against the undue negative consequences of underreacting to indications of inclement weather 230b. Furthermore, the disclosed centralized and systematic approach to fleet management includes continual collection of information related to the effectiveness of fleet management at scale (e.g., over an entire fleet 210 or multiple fleets 210 that experience substantially similar weather conditions 230) to allow for refinement of the fleet management approach.

Figure 3:
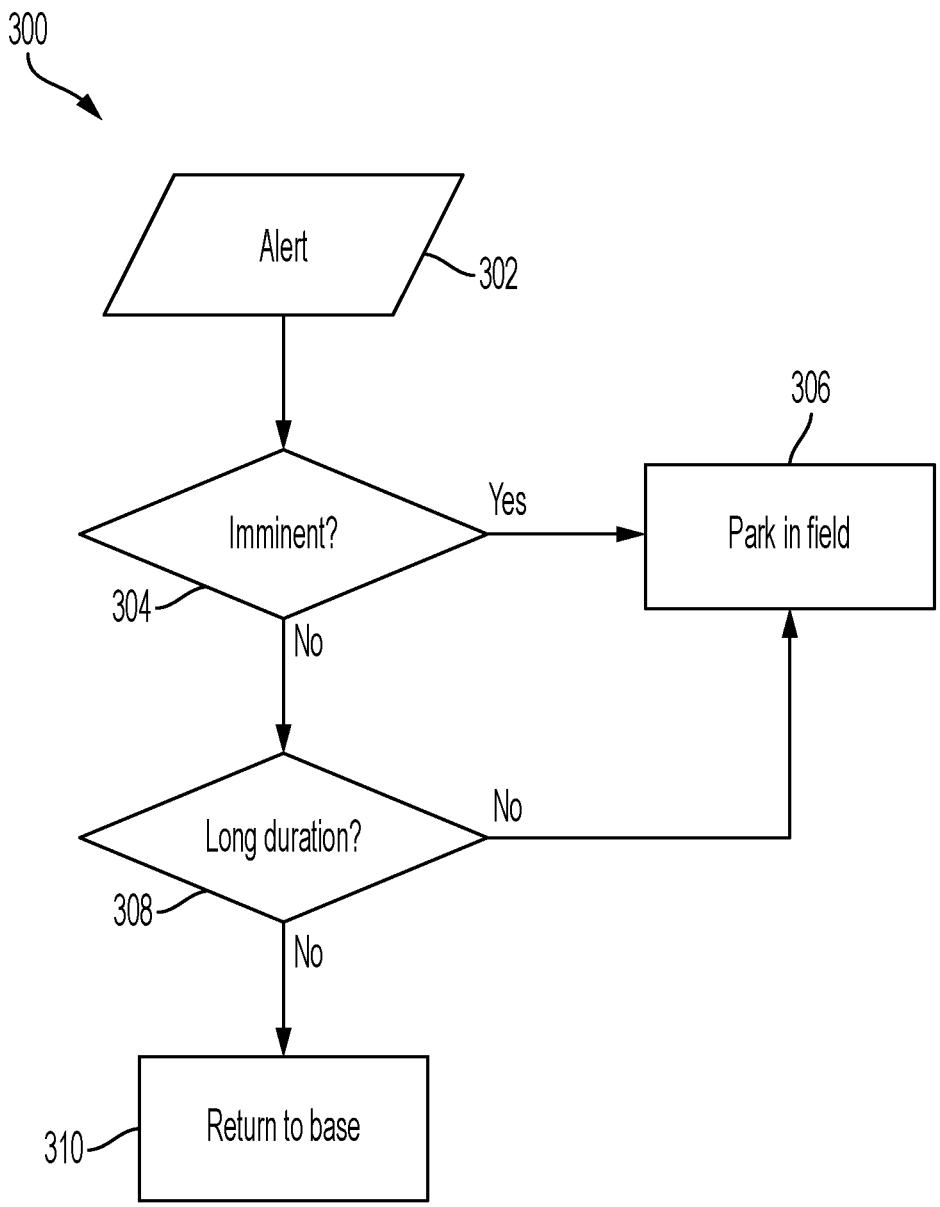
FIG. 3 illustrates an example flowchart for fleet management.

FIG. 3 illustrates an example flowchart 300 depicting a method for processing a weather alert 302. As described above, the weather alert 302 may come from a commercial subscription service, or a government alert system and may include information in the form of a message or group of related messages. The alert 302 may indicate a forecast probability (and/or a probability profile over time) for inclement weather, a forecast intensity (and/or an intensity profile over time) as well as a type of inclement weather (e.g., rain, snow, sleet, hail, etc.). The weather alert 302 may also include geographical information, e.g., a predicted range or area for very localized weather events, such as thunder showers, tornadoes, and so forth. The fleet manager may analyze this information and other factors to determine whether an action should be taken with respect to the fleet 210. For example, each type of inclement weather may have associated threshold values of, e.g., probability, intensity, or other factor or combination of factors that would likely impair the capabilities of the fleet 210 to a sufficient degree as to warrant an action. For example, a 30% probability of sleet or freezing rain may be sufficient to impair an AV 102 in the geographical area of inclement weather, but a relatively higher probability of snow or heavy rain may be required for the fleet manager to take an action. If the probability and/or intensity of the type of inclement weather fails to satisfy one or more threshold values, the fleet manager may decide not to take any action. However, if one or more thresholds (or combinations of values) is satisfied, the fleet manager may apply the thresholds to the weather alert 302 to determine a likely onset time for a sufficiently severe period of inclement weather in the geographical region where the fleet is operating and may determine a likely duration of the inclement weather. After analyzing the weather alert 302 to determine the predicted onset time and duration, the fleet manager may transmit commands (e.g., in the form of weather advisories) to one or more vehicles, causing those vehicles to take appropriate actions.

Furthermore, by analyzing the weather alert 302, the fleet manager may determine which vehicles 102 are predicted to be affected. For example, by analyzing geographical information including in the weather alert 302, the fleet manager may determine which vehicles 102 of the fleet 210 are predicted to be affected by the inclement weather, i.e., which vehicles 102 are expected to be in the geographical area of the predicted inclement weather at the predicted time (and/or during the predicted duration) of the inclement weather. In this case, the fleet manager may only transmit commands to the particular vehicles 102 that are predicted to be affected. Similarly, the fleet manager may determine that only certain types of vehicles 102 or only vehicles that are performing certain types of missions are likely to be affected by the inclement weather (e.g., due to the nature of the perception system deployed on particular types of vehicles 102, or due to the perception requirements for particular types of missions, and so forth).

At step 304, the method includes determining whether the forecast time for the onset of the inclement weather 230b is within an onset threshold period of time, such as within ten (10) minutes, of the current time. Other onset thresholds (including either greater than or less than ten minutes) are also within the scope of this disclosure. If the inclement weather 230b is not forecast to begin for at least the onset-threshold period of time (or the inclement weather 230b is not forecast to achieve a threshold intensity level for at least the onset-threshold period of time), the fleet manager may instruct the fleet 210 to return to the base of operations 220. That is, if vehicles 102 of the fleet are able to reach the base(s) of operations before their ability is impaired, the fleet manager may command the vehicles 102 to do so. The onset-threshold period of time may be based on an estimated time for vehicles 102 of the fleet 210 to return to the base of operations 220, e.g., derived from historical data for vehicles 102 of the fleet 210 deployed from the base of operations 220. In some examples, the onset-threshold period of time is the maximum (or the average) estimated time for each AV 102 in the fleet to return to the base of operations 220 from its location in the field at the time the fleet manager receives the alert 302. Thus, if each AV 102 (or, e.g., a majority of AVs 102) are estimated to be able to return to the base of operations 220 prior to the onset of inclement weather 230b, the fleet manager may transmit a weather advisory (402, FIG. 4) to the fleet 210, instructing the vehicles 102 of the fleet to return to the base of operations 220. As described in more detail below, the weather advisor 402 may include information about the predicted weather and may include specialized instructions for the vehicles 102 to follow under the circumstances (e.g., in lieu of standard operating instruction). However, if the forecast time for the onset of the inclement weather 230b is below the onset-threshold (e.g., if no AVs 102 or only a small number of AVs 102 are likely to be able to return to the base of operations 220 prior to the onset of the inclement weather 230b), the fleet manager may transmit a weather advisory 402 to the fleet 210, instructing vehicles 102 of the fleet to go to (e.g., to park in) a suitable location in the field 306 for the duration of the inclement weather 230b.

Suitable locations may include any safe location and may preferably include a location configured to contain stationary vehicles, such as a parking space, lot, deck, and so forth. The suitable location may be a public parking space on the side of the road on which the AV 102 is operating when the AV 102 receives the weather advisory 402. In some examples, the suitable location is a dedicated location for the AV 102 to pick up and/or drop off passengers and/or goods. For example, the AV 102 may perform passenger-transportation missions similar to a bus service, including dedicated stops along pre-defined routes. In this example, the AV 102 may proceed to the next suitable stop in response to receiving the weather advisory 402. In other examples, the AV 102 maintains (or has access to) mapping information, including information about nearby locations that are suitable for parking in for extended periods of time (e.g., for the threshold duration disclosed below). In some cases, the mapping information may further include means to assess availability of nearby parking locations, e.g., by access a database of a parking-lot operator. In some cases, the mapping data may be used to identify nearby open spaces that are suitable for parking. Other approaches for determining nearby locations that are suitable for remaining parked for the duration of inclement weather are also in the scope of this disclosure.

At step 304, the fleet manager may optionally base the decision whether to transmit the weather advisory 402 on the forecast intensity and type of the imminent inclement weather 230b. For example, if the forecast intensity is sufficiently low (e.g., less than an intensity threshold), the ability of the AVs 102 to sense objects in the environment may be unaffected or only marginally affected by the inclement weather 230b. In this case, the fleet manager may disregard the weather alert 302 or otherwise proceed as if the no weather alert 302 had been received. Other factors that the fleet manager may consider include the length of time remaining in a shift or other such "edge cases" that might cause the fleet manager to transmit a weather advisory 402 instructing the entire fleet 210 to return to the base of operations 220, rather than park in the field. Recalling the entire fleet 210 to the base of operations 220 may avoid having one or more vehicles parked in the field during the normal inter-shift period of time when vehicles 102 are made ready (at the base of operations 220) to begin a subsequent shift. In other words, the fleet manager may err more on the side of caution as the end of a shift nears, to avoid the inefficiencies of having some or all of the fleet 210 unavailable for change-of-shift activities. In some examples, even if the forecast probability and/or intensity of inclement weather is low, but the fleet manager receives the weather alert 302 within a threshold period of time of the end of a shift (or other meaningful event, such as a scheduled break in operations), the fleet manager may transmit a weather advisory 402 causing the entire fleet 210 to return to the base of operations 220.

At step 308, the method includes determining whether the forecast time for the duration of the inclement weather 230b is below a duration threshold such as sixty (60) minutes. Other duration thresholds (including durations either greater than or less than sixty minutes) are also within the scope of this disclosure. If the inclement weather 230b is not forecast to persist (e.g., continue to be above a threshold likelihood of affecting the fleet) for at least a threshold duration, the fleet manager may, at step 306, instruct one or more vehicles 102 of the fleet 210 to go to a suitable location in the field for the duration of the inclement weather 230b, rather than returning to the base of operations 220. By instructing the fleet 210 to park in the field, the fleet 210 will be better positioned to return to operation after the inclement weather 230b abates (e.g., saving the time that would have been required to return to the field from the base of operations 220). As in the case of the onset threshold, the duration threshold may also be derived from historical data for the fleet 210 deployed from the base of operations 220, and may also be fine-tuned over time as additional historical information is collected. If, however, the forecast time for the duration of the inclement weather 230b is above the duration threshold, the fleet manager may, at step 310, transmit a weather advisory 402 to each AV 102 in the fleet 210, instructing each AV 102 to return to the base of operations 220.

Figure 4:
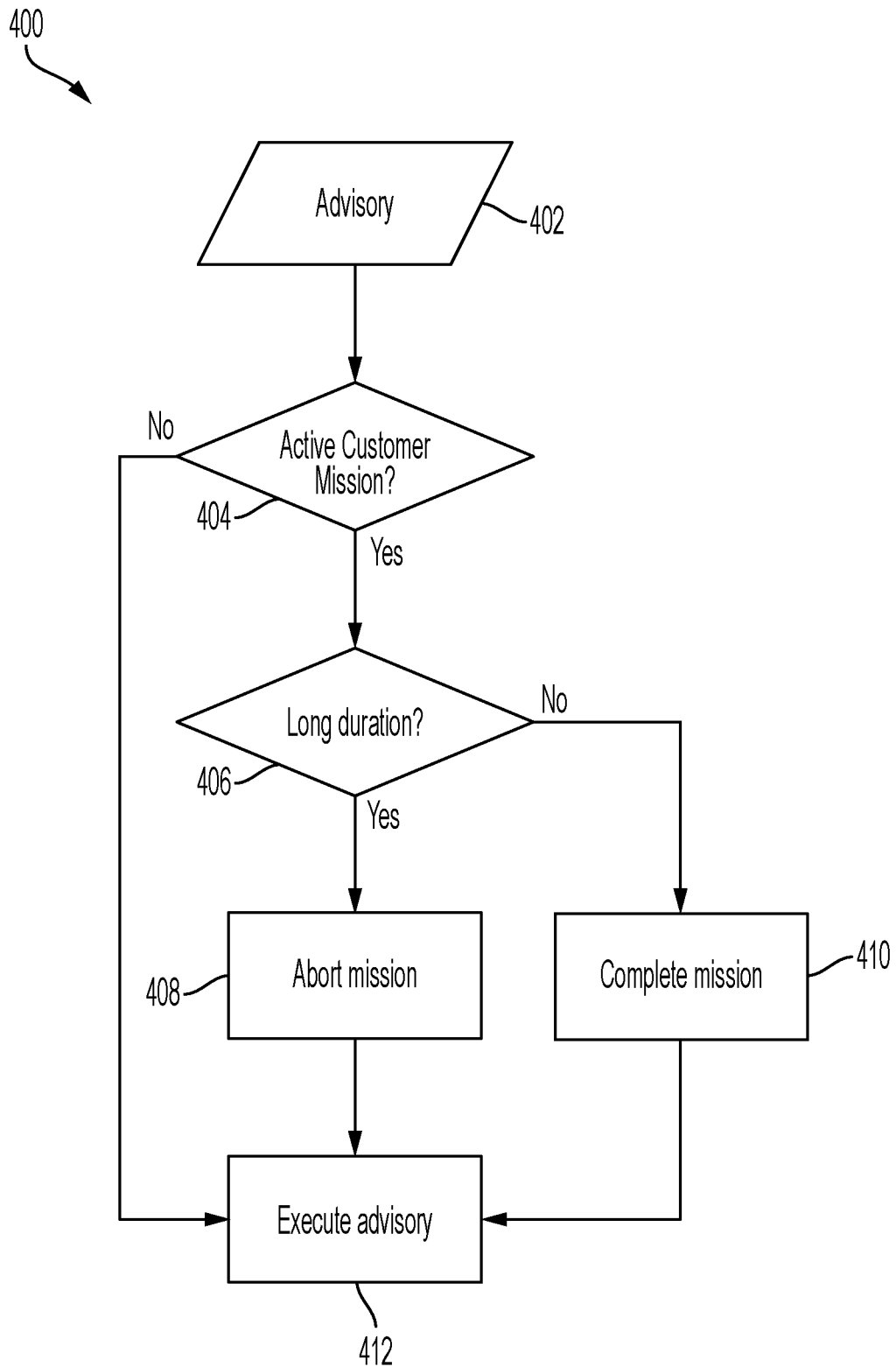
FIG. 4 illustrates another example flowchart for fleet management.

FIG. 4 illustrates an example flowchart 400 depicting a method for processing a weather advisory 402. In this example, the fleet manager transmits weather advisory 402 to the AVs 102 for processing. In other examples, some or all of the processing may be performed by the fleet manager prior to transmitting the weather advisory 402. As described above, the weather advisory 402 may include instructions to go to a suitable location in the field for the duration of the inclement weather 230*b* or instructions to return to the base of operations 220. The weather advisory 402 may include additional information, such as the forecast onset time, duration, intensity, and/or other characteristic of the forecast inclement weather 230*b*. The weather advisory 402 may include an indication that the advisory should be given prioritized processing. For example, the weather advisory 402 may be marked as urgent so that it is processed ahead of other advisories received by the AV 102. At step 404, the method includes determining whether the AV 102 is currently performing a customer-facing mission. If the AV is current performing a customer-facing mission, or if the AV 102 is configured to accept customer facing-missions, the AV 102 may first take itself out of service. That is, the AV 102 may decline to accept new requests to transport passengers or goods. In some examples, the fleet manager will take the AV 102 out of service in conjunction with transmitting the weather advisory 402, e.g. shortly before or shortly after transmitting the weather advisory 402. That is, the fleet manager may decline, on behalf of the AV 102, to accept new requests to transport passengers or goods.

If not (e.g., if the AV 102 is performing a mapping, training, or other mission that can be immediately terminated or suspended without affecting a customer and/or passenger), the method includes, at step 412, executing, e.g., by the AV 102, the instructions provided in the weather advisory 402. If, however, the AV 102 is in the process of performing a customer-facing mission, such as transporting a passenger or delivering goods, the method includes, at step 406, estimating the remaining time to complete the current mission. If the time to complete the mission is less than a completion-time threshold (e.g., five minutes), the method includes, at step 410, completing the current mission before executing, at step 412, the instructions provided in the weather advisory 402. However, if the estimated time to complete the current mission is greater than the completion-time threshold, the method includes, at step 408, terminating the mission that is currently in progress before executing, at step 412, the instructions provided in the weather advisory 402. Terminating the mission may include dropping off a passenger at a nearby pickup/drop off point. For example, the AV 102 may have access to a database or other form of mapping information including the location of known and/or designated pickup/drop-off points. Terminating the mission may include identifying a nearby pickup/drop-off point and re-routing the AV 102 to go to the pickup/drop-off point and drop off the passenger prior to performing the instructions of the weather advisory 402. In some examples, the mapping information includes information regarding designated pickup/drop-off points and also contains information of other known locations that may be used as makeshift pickup/drop-off points if needed. For example, if the routing controller of the AV 102 estimates that the AV 102 will be unable to travel to a designated pickup/drop-off point within a short period of time, the method may include selecting a makeshift pickup/drop-off point from the set of other known locations, such that the AV 102 is likely to be able to travel to the makeshift pickup/drop-off point within the short period of time. Whether the customer-facing mission is completed or aborted/terminated, when the AV 102 that is executing a customer-facing mission receives the weather advisory 402, the AV 102 may first indicate, to customers, that it is not currently in service. That is, the AV 102 may reject offers to perform additional customer-facing missions until the weather advisory 402 has been retired.

Figure 5:
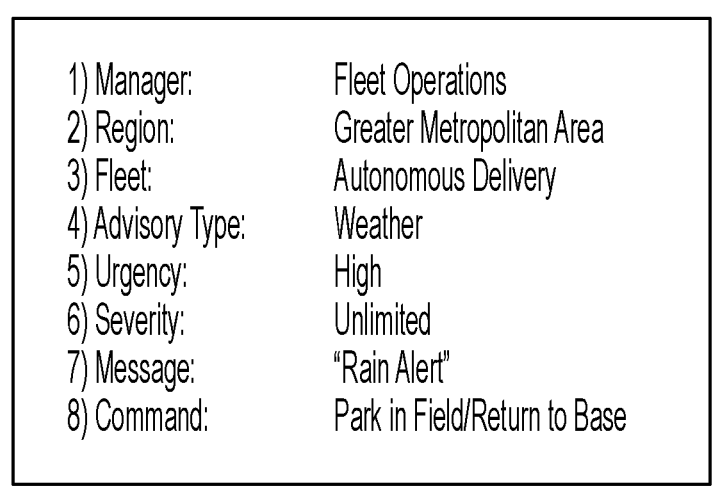
FIG. 5 illustrates a an example weather advisory format.

In some examples, the weather advisory (402, FIG. 4) includes relevant information in a standardized format, e.g., such that the AV 102 may more easily process the weather advisory 402 and perform the associated command. FIG. 5 shows an example format 500 for a weather advisory 402. The example format 500 includes fields related to fleet management (e.g., fields 1-3), including the organizational name of the fleet manager, the geographical region serviced by the fleet 210, and the organizational name of the fleet or sub-fleet (e.g., in the case where multiple fleets 210 operate within the same (or overlapping) geographical regions. The example format 500 also includes fields which provide information about the predicted weather. As shown, field 4 identified the advisory as a weather advisory 402. Fields 5 and 6 provide additional details, such as urgency or response and severity of the predicted weather. Field 7 provides a text message, e.g. suitable for display on a display screen of the AV 102, such that occupants of the AV 102 may be informed of the nature of the advisory 402 received by the AV 102. As shown, field 8 includes the command for the AV 102 to perform. As discussed above, the fleet manager may command one or more AVs 102 to return to a terminal or base of operations 220, or to park in a suitable nearby location in the field, e.g., without first returning to the base of operations 220.

Figure 6:
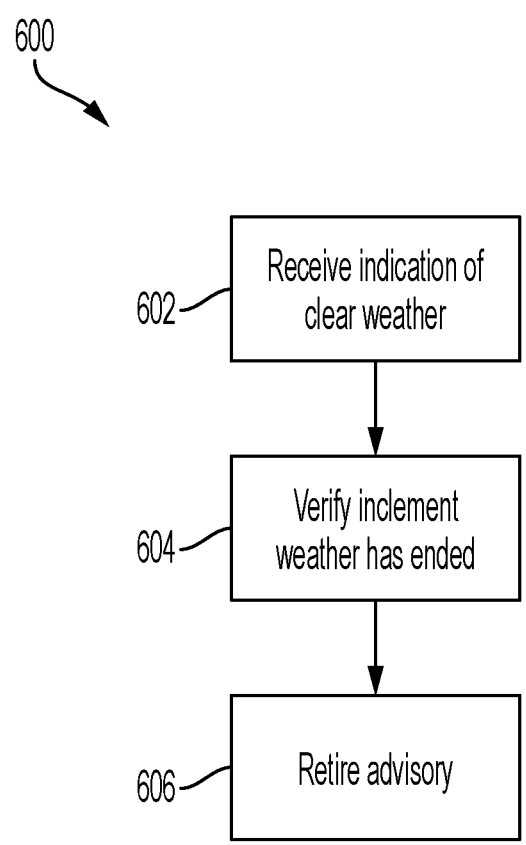
FIG. 6 illustrates another example flowchart for fleet management.

FIG. 6 illustrates an example flowchart 600 depicting a method for retiring a weather advisory 402. At step 602, the fleet manager may receive an indication that the weather advisory 402 should be retired. In some examples, the indication is an alert from a weather service, e.g., an "all clear" notification from the same service that provided inclement weather alert 302. In other examples, the fleet manager infers the indication based on a lack of recent inclement weather alerts 302, e.g., an absence of additional weather alerts during the duration of the inclement weather. As one non-limiting example, the original inclement weather alert 302 may have included a predicted inclement-weather duration of twenty-five minutes. In this example, after twenty-five minutes have passed since the predicted onset of the inclement weather, if the fleet manager has not received any further weather alert 302, the fleet manager may infer that the weather advisory 402 should be retired. Other indications that the weather advisory 402 should be retired are also within the scope of this disclosure. At step 604, the fleet manager may verify that the inclement weather has ended. For example, the fleet manager may operate a "scout car" configured to detect inclement weather. For example, the scout car may sense environmental parameters, such as temperature, humidity, visibility, and so forth, and provide measurements to the fleet manager. The scout car may be especially equipped with sensors to detect these parameters (and others), or the scout car may sense the parameters using standard sensors. For example, rain sensor which activate windshield wipers may also provide information about whether the inclement weather has ceased. The fleet manager may dispatch one or more scout cars to scout portions of the geographical region prior to retiring the weather advisory 402. In some examples, one or more of the vehicles 102 that had been commanded to are park in the field may be commanded to act as scout cars. For example, the fleet manager may dispatch one or more vehicles 102 from their parked locations to patrol portions of the geographical region that are adjacent to their parking location. The fleet manager may select vehicles 102 to act as scout cars based on their parked location (e.g., to quickly obtain adequate sample coverage throughout the geographical region). AVs 102 may also be selected based on their particular ability to perceive whether the inclement weather has ceased as discussed above. In some examples, the fleet manager may operate the one or more scout cars for a threshold period of time (such as thirty minutes) and/or for over a threshold coverage area of the geographical region (such as 25%) in order to determine that the weather advisory 402 should be retired. Both longer and shorter threshold time periods and larger and smaller threshold coverage amounts are within the scope of this disclosure. At step 606, after the fleet manager has determined with a sufficiently high confidence level that the weather advisory 402 should be retired, the fleet manager may transmit a message (such as a subsequent advisory) to vehicles 102 of the fleet 210 instructing the vehicles 102 to return to normal operation. Returning to normal operation may include completing any missions that were in progress at the time of the original weather advisory 402 and/or resuming accepting requests to transporting passengers or goods. In some examples, determining that the weather advisory 402 should be retired includes not receiving additional weather alerts or otherwise determining that no additional inclement weather is predicted (or likely) within a threshold period of time.

As discussed above, analyzing weather alerts to determine whether an action should be performed by one or more vehicles 102 of the fleet 210 may include comparing parameters to threshold values. For example, the fleet manager may ignore a weather alert 302 when the probability of inclement weather is below a probability threshold. To improve the system over time, the fleet manager may track metrics related to operational weather management. The fleet manager may use the tracked metrics to understand the effectiveness of operational weather management in balancing the negative effects of overreacting and underreacting. The fleet manager may further use the tracked metrics to improve the balance, e.g., by adjusting one or more threshold values. In some examples, metrics are continually tracked and are continually or periodically applied to a machine-learning or optimization model configured to predict improved threshold values for subsequent use.

The following table shows an example list of metrics that may be tracked, separated by category.

---
FEASIBILITY

Completion rate for returning to base before the weather advisory is retired
Completion rate for parking in a nearby location before the weather advisory is retired
Rate of vehicles parked in a field location during a shift end (or other disruptive "edge case")
EFFICIENCY Average time to complete a return to base of operations
Average time to complete a parking in a nearby location
Average distance to complete a return to base of operations
Average distance to complete a parking in a nearby location ---
-continued

FORECAST ACCURACY

Rate of disabling weather events during weather advisories
Rate of disabling weather events without a weather advisory

---

The rate of disabling weather events during weather advisories and the rate of disabling weather events without a weather advisory reflect rates of true positives (the weather advisory was issued and inclement weather actually occurred) and false negatives (no weather advisory was issued but inclement weather actually occurred), respectively. The rates of false positives and true negatives may be inferred from these metrics. The other metrics may be used to fine-tune the process of determining whether to instruct vehicles 102 to park in the field or return to the base of operation, and/or to fine-tune threshold values used to determine whether to instruct vehicles 102 to park in the field or return to the base of operation.

The metrics may also be used to evaluate the accuracy of various sources of weather alerts. That is, the metrics (particularly the rates of false positives and false negatives) may be separately tracked for each source of weather alerts. As discussed above, sources of weather alerts may include government sources, commercial sources, and freely available subscription services. The fleet manager may use the separately tracked metrics to eliminate less reliable sources of weather alerts, such as sources that are more consistently associated with false positives and/or false negatives. Alternatively or additionally, the fleet manager may use the separately tracked metrics to fine-tune one or more threshold values for each source of weather alerts to create an ensemble probability of inclement weather from multiple sources of weather alerts.

Figure 7:
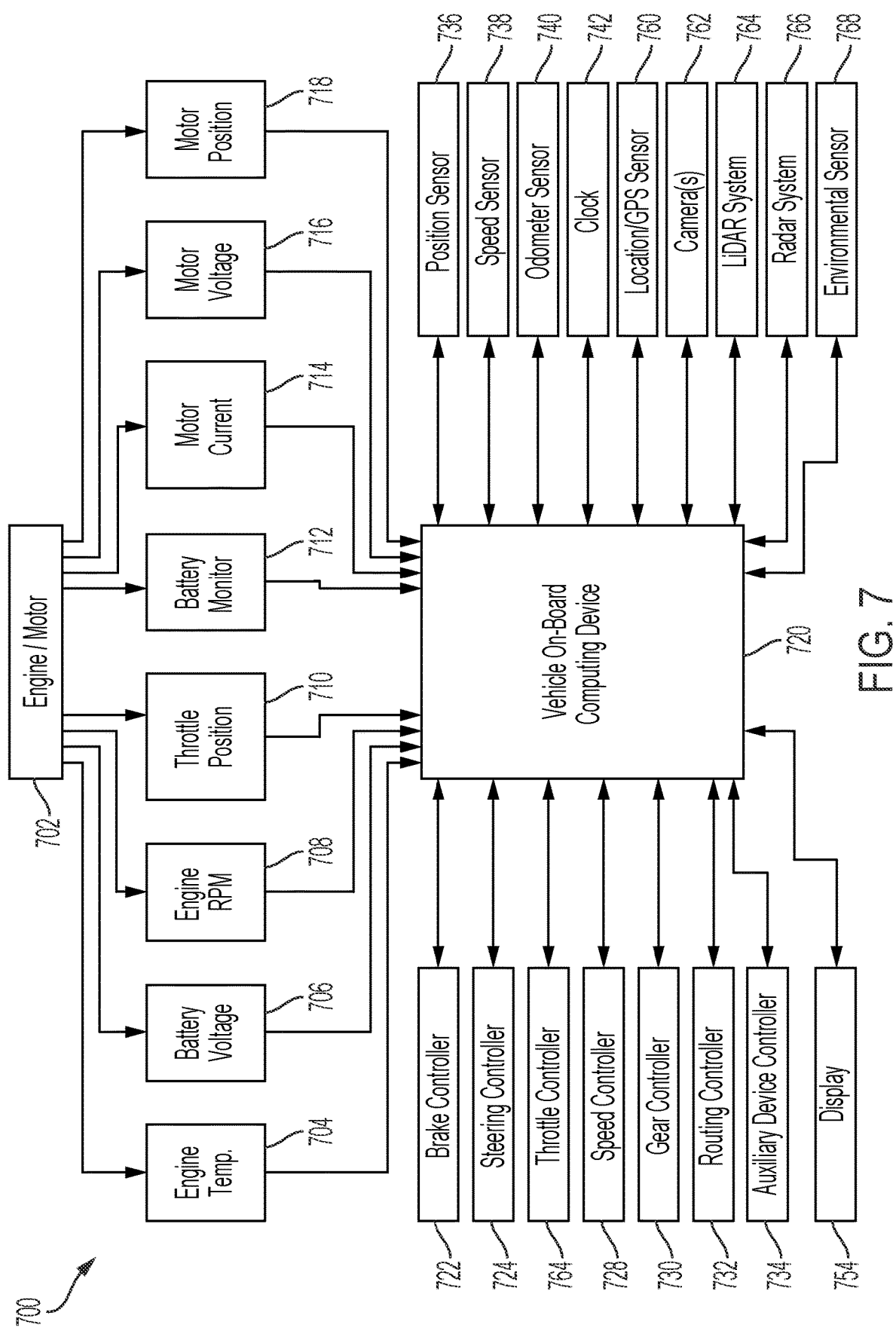
FIG. 7 illustrates an example architecture for a vehicle, in accordance with aspects of the disclosure.

FIG. 7 illustrates an example system architecture 700 for a vehicle, in accordance with aspects of the disclosure. Vehicles 102 and/or 103 of FIG. 1 can have the same or similar system architecture as that shown in FIG. 7. Thus, the following discussion of system architecture 700 is sufficient for understanding vehicle(s) 102, 103 of FIG. 1. However, other types of vehicles are considered within the scope of the technology described in this document and may contain more or less elements as described in association with FIG. 7. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 7, system architecture 700 for a vehicle includes an engine or motor 702 and various sensors 704-718 for measuring various parameters of the vehicle. In gas-powered or hybrid vehicles having a fuel-powered engine, the sensors may include, for example, an engine temperature sensor 704, a battery voltage sensor 706, an engine revolutions per minute ("RPM") sensor 708, and a throttle position sensor 710. If the vehicle is an electric or hybrid vehicle, then the vehicle may have an electric motor, and accordingly includes sensors such as a battery monitoring system 712 (to measure current, voltage and/or temperature of the battery), motor current 714 and voltage 716 sensors, and motor position sensors 718 such as resolvers and encoders.

Operational parameter sensors that are common to both types of vehicles include, for example: a position sensor 736 such as an accelerometer, gyroscope and/or inertial measurement unit; a speed sensor 738; and an odometer sensor 740. The vehicle also may have a clock 742 that the system uses to determine vehicle time during operation. The clock 742 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 760 (such as a Global Positioning System ("GPS") device); object detection sensors such as one or more cameras 762; a lidar system 764; and/or a radar and/or a sonar system 766. The sensors also may include environmental sensors 768 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 720. The on-board computing device 720 may be implemented using the computer system of FIG. 8. The vehicle on-board computing device 720 analyzes the data captured by the sensors and optionally controls operations of the vehicle based on results of the analysis. For example, the vehicle on-board computing device 720 may control: braking via a brake controller 722; direction via a steering controller 724; speed and acceleration via a throttle controller 726 (in a gas-powered vehicle) or a motor speed controller 728 (such as a current level controller in an electric vehicle); a differential gear controller 730 (in vehicles with transmissions); and/or other controllers. Auxiliary device controller 734 may be configured to control one or more auxiliary devices, such as testing systems, auxiliary sensors, mobile devices transported by the vehicle, etc.

Geographic location information may be communicated from the location sensor 760 to the on-board computing device 720, which may then access a map of the environment that corresponds to the location information to determine known fixed features of the environment such as streets, buildings, stop signs and/or stop/go signals. Captured images from the cameras 762 and/or object detection information captured from sensors such as lidar system 764 is communicated from those sensors) to the on-board computing device 720. The object detection information and/or captured images are processed by the on-board computing device 720 to detect objects in proximity to the vehicle. Any known or to be known technique for making an object detection based on sensor data and/or captured images can be used in the embodiments disclosed in this document.

Lidar information is communicated from lidar system 764 to the on-board computing device 720. Additionally, captured images are communicated from the camera(s) 762 to the vehicle on-board computing device 720. The lidar information and/or captured images are processed by the vehicle on-board computing device 720 to detect objects in proximity to the vehicle. The manner in which the object detections are made by the vehicle on-board computing device 720 includes such capabilities detailed in this disclosure.

In addition, the system architecture 700 may include an onboard display device 754 that may generate and output an interface on which sensor data, vehicle status information, or outputs generated by the processes described in this document are displayed to an occupant of the vehicle. The display device may include, or a separate device may be, an audio speaker that presents such information in audio format.

The on-board computing device 720 may include and/or may be in communication with a routing controller 732 that generates a navigation route from a start position to a destination position for an autonomous vehicle. The routing controller 732 may access a map data store to identify possible routes and road segments that a vehicle can travel on to get from the start position to the destination position. The routing controller 732 may score the possible routes and identify a preferred route to reach the destination. For example, the routing controller 732 may generate a navigation route that minimizes Euclidean distance traveled or other cost function during the route, and may further access the traffic information and/or estimates that can affect an amount of time it will take to travel on a particular route. Depending on implementation, the routing controller 732 may generate one or more routes using various routing methods, such as Dijkstra's algorithm, Bellman-Ford algorithm, or other algorithms. The routing controller 732 may also use the traffic information to generate a navigation route that reflects expected conditions of the route (e.g., current day of the week or current time of day, etc.), such that a route generated for travel during rush-hour may differ from a route generated for travel late at night. The routing controller 732 may also generate more than one navigation route to a destination and send more than one of these navigation routes to a user for selection by the user from among various possible routes.

In various embodiments, the on-board computing device 720 may determine perception information of the surrounding environment of the vehicle. Based on the sensor data provided by one or more sensors and location information that is obtained, the on-board computing device 720 may determine perception information of the surrounding environment of the vehicle. The perception information may represent what an ordinary driver would perceive in the surrounding environment of a vehicle. The perception data may include information relating to one or more objects in the environment of the vehicle. For example, the on-board computing device 720 may process sensor data (e.g., lidar or radar data, camera images, etc.) in order to identify objects and/or features in the environment of the vehicle. The objects may include traffic signals, roadway boundaries, other vehicles, pedestrians, and/or obstacles, etc. The on-board computing device 720 may use any now or hereafter known object recognition algorithms, video tracking algorithms, and computer vision algorithms (e.g., track objects frame-to-frame iteratively over a number of time periods) to determine the perception.

In some embodiments, the on-board computing device 720 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The on-board computing device 720 may perform one or more prediction and/or forecasting operations. For example, the on-board computing device 720 may predict future locations, trajectories, and/or actions of one or more objects. For example, the on-board computing device 720 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the on-board computing device 720 may predict whether the object will likely move straight forward or make a turn. If the perception data indicates that the intersection has no traffic light, the on-board computing device 720 may also predict whether the vehicle may have to fully stop prior to entering the intersection.

In various embodiments, the on-board computing device 720 may determine a motion plan for the autonomous vehicle. For example, the on-board computing device 720 may determine a motion plan for the autonomous vehicle based on the perception data and/or the prediction data. Specifically, given predictions about the future locations of proximate objects and other perception data, the on-board computing device 720 can determine a motion plan for the AV 102 that best navigates the autonomous vehicle relative to the objects at their future locations.

In some embodiments, the on-board computing device 720 may receive predictions and make a decision regarding how to handle objects and/or actors in the environment of the vehicle. For example, for a particular actor (e.g., a vehicle with a given speed, direction, turning angle, etc.), the on-board computing device 720 decides whether to overtake, yield, stop, and/or pass based on, for example, traffic conditions, map data, state of the autonomous vehicle, etc. Furthermore, the on-board computing device 720 also plans a path for the vehicle to travel on a given route, as well as driving parameters (e.g., distance, speed, and/or turning angle). That is, for a given object, the on-board computing device 720 decides what to do with the object and determines how to do it. For example, for a given object, the on-board computing device 720 may decide to pass the object and may determine whether to pass on the left side or right side of the object (including motion parameters such as speed). The on-board computing device 720 may also assess the risk of a collision between a detected object and the vehicle. If the risk exceeds an acceptable threshold, it may determine whether the collision can be avoided if the autonomous vehicle follows a defined vehicle trajectory and/or implements one or more dynamically generated emergency maneuvers is performed in a time period (e.g., N milliseconds). If the collision can be avoided, then the on-board computing device 720 may execute one or more control instructions to perform a cautious maneuver (e.g., mildly slow down, accelerate, change lane, or swerve). In contrast, if the collision cannot be avoided, then the on-board computing device 720 may execute one or more control instructions for execution of an emergency maneuver (e.g., brake and/or change direction of travel).

As discussed above, planning and control data regarding the movement of the autonomous vehicle is generated for execution. The on-board computing device 720 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 8:
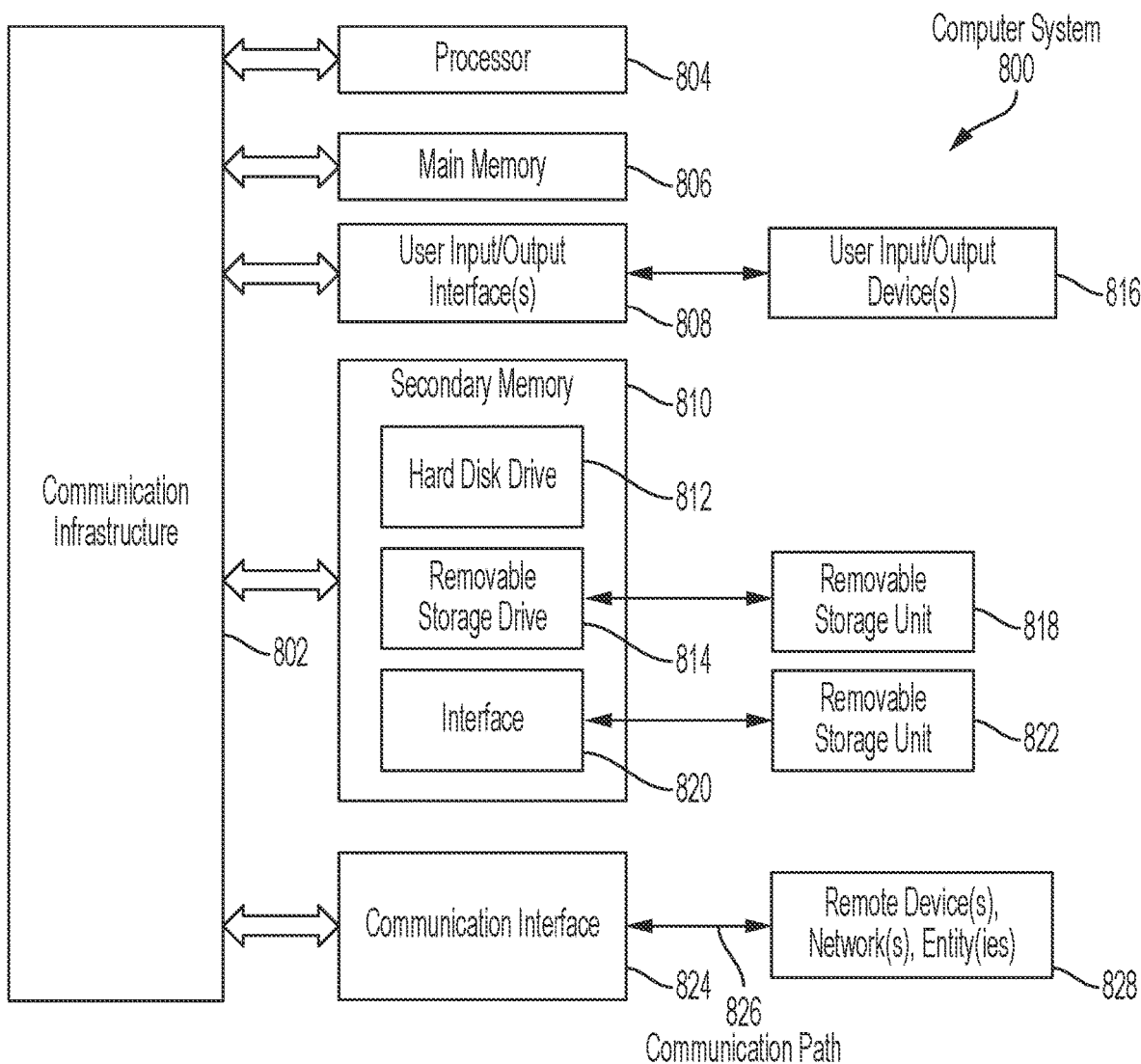
FIG. 8 is an example computer system useful for implementing various embodiments.

Various embodiments can be implemented, for example, using one or more computer systems, such as computer system 800 shown in FIG. 8. Computer system 800 can be any computer capable of performing the functions described in this document.

Computer system 800 includes one or more processors (also called central processing units, or CPUs), such as a processor 804. Processor 804 is connected to a communication infrastructure or bus 802. Optionally, one or more of the processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 816, such as monitors, keyboards, pointing devices, etc., that communicate with communication infrastructure 802 through user input/output interface(s) 808.

Computer system 800 also includes a main or primary memory 806, such as random access memory (RAM). Main memory 806 may include one or more levels of cache. Main memory 806 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 814 reads from and/or writes to removable storage unit 818 in a well-known manner.

According to an example embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 800, main memory 806, secondary memory 810, and removable storage units 818 and 822, as well as tangible articles of manufacture embodying any combination of the foregoing. Such control logic, when executed by one or more data processing devices (such as computer system 800), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described in this document.

Figure 9:
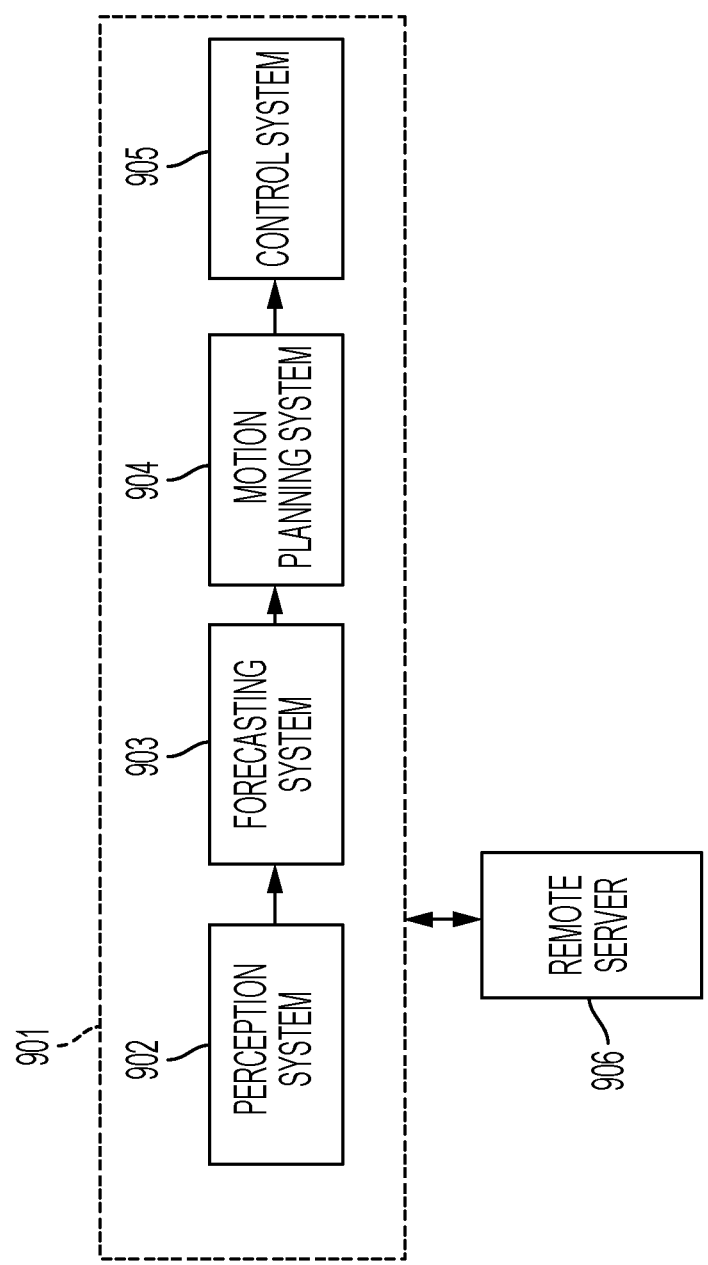
FIG. 9 is a block diagram that illustrates example subsystems of an autonomous vehicle.

FIG. 9 shows a high-level overview of vehicle subsystems that may be relevant to the discussion above. Specific components within such systems will be described in the discussion of FIG. 7 in this document. Certain components of the subsystems may be embodied in processor hardware and computer-readable programming instructions that are part of the vehicle on-board computing system 901.

The subsystems may include a perception system 902 that includes sensors that capture information about moving actors and other objects that exist in the vehicle's immediate surroundings. Example sensors include cameras, lidar sensors and radar sensors. The data captured by such sensors (such as digital image, lidar point cloud data, or radar data) is known as perception data. The perception data may include data representative of one or more objects in the environment. The perception system may include one or more processors, along with a computer-readable memory with programming instructions and/or trained artificial intelligence models that, during a run of the vehicle, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

If the vehicle is an AV, the vehicle's perception system 902 may deliver perception data to the vehicle's forecasting system 903. The forecasting system (which also may be referred to as a prediction system) will include processors and computer-readable programming instructions that are configured to process data received from the perception system and forecast actions of other actors that the perception system detects.

In an AV, the vehicle's perception system, as well as the vehicle's forecasting system, will deliver data and information to the vehicle's motion planning system 904 and motion control system 905 so that the receiving systems may assess such data and initiate any number of reactive motions to such data. The motion planning system 904 and control system 905 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause the vehicle hardware to take include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

In non-AV embodiments, such as with vehicles that are driven by human operators, the motion planning system 904 may be embodied in processor hardware and computer-readable hardware that are part of an electronic devices that is contained with the vehicle, such as a dashboard navigation system or a mobile electronic device of the operator. In such situations, the electronic device may output the trajectories planned by the motion planning system via a display, an audio speaker, or both. In addition, some parts of the perception system 902 may include a transceiver of an electronic device that receives certain perception data (such as weather data) from a remote server via wireless communication.

The vehicle's on-board computing system 901 will be in communication with a remote server 906. The remote server 906 is an external electronic device that is in communication with the vehicle's on-board computing system 901, either via a wireless connection while the vehicle is making a run, or via a wired or wireless connection while the vehicle is parked at a docking facility or service facility. The remote server 906 may receive data that the vehicle collected during its run, such as perception data and operational data. The remote server 906 also may transfer data or other information to the vehicle such as software updates, high definition (HD) map updates, machine learning model updates and other information.

The features from different embodiments disclosed in this document may be freely combined. For example, one or more features from a method embodiment may be combined with any of the system or product embodiments. Similarly, features from a system or product embodiment may be combined with any of the method embodiments disclosed in this document.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

A "run" of a vehicle refers to an act of operating a vehicle and causing the vehicle to move about the real world. A run may occur in public, uncontrolled environments such as city or suburban streets, highways, or open roads. A run may also occur in a controlled environment such as a test track.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The term "wireless communication" refers to communication between two devices in which at least a portion of the communication path includes a signal that is transmitted wirelessly, but it does not necessarily require that the entire communication path be wireless.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set, as well as the machine learning model are often difficult to obtain and should be kept confidential. The current disclosure describes systems and methods for providing a secure machine learning pipeline that preserves the privacy and integrity of datasets as well as machine learning models.

As used in this document, the terms "infer" and "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

As described above, this document discloses system, method, and computer program product embodiments for preparing a fleet of autonomous vehicles for service. The system embodiments include preparing a fleet of autonomous vehicles for service. The computer program embodiments include programming instructions, e.g., stored in a memory, to cause a processor to perform the data management methods described in this document. The system embodiments also include a processor which is configured to perform the methods described in this document, e.g., via the programming instructions. More generally, the system embodiments include a system comprising means to perform the steps of the any of the methods described in this document.

In various embodiments, the methods include a method of managing a fleet of autonomous vehicles. The method includes operating a fleet of autonomous vehicles within a geographical region, the fleet of autonomous vehicles performing one or more missions. The method further includes receiving a weather alert including a prediction of inclement weather, the weather alert including a predicted onset time and a predicted duration of the inclement weather. The method further includes analyzing the weather alert to determine one or more actions for one or more vehicles of the fleet of autonomous vehicles to perform, wherein the one or more actions include parking in a nearby location in the geographical region or returning to a base of operations. The method further includes, in response to the analysis, transmitting, to the one or more vehicles of the fleet of autonomous vehicles, a weather advisory, causing each of the one or more vehicles to perform at least one of the one or more actions.

Implementations of the disclosure may include one or more of the following optional features. The nearby location may include a designated pickup/drop-off area. In some examples, the analysis includes determining that an onset period until the predicted onset time is less than an onset threshold or that the predicted duration is less than a duration threshold, and transmitting the weather advisory causes each of the one or more vehicles to park in the nearby location. The onset threshold may be based on estimated times for the one or more vehicles to return to the base of operations. In some examples, the analysis includes determining that the onset period is not less than the onset threshold and that the predicted duration is not less than the duration threshold, and transmitting the weather advisory causes each of the one or more vehicles to return to the base of operations. In some examples, the weather alert further includes geographical information associated with the prediction of inclement weather, and the analysis is based on the geographical information. In some examples, the geographical information includes a predicted range of the inclement weather, and the one or more vehicles include vehicles expected to be in the predicted range during the predicted duration of the inclement weather. In some examples, the weather alert further includes a predicted weather type and/or intensity, and the analysis is based on the predicted weather type and/or intensity. In some examples, the method further includes, after the predicted duration, retiring the weather advisory by transmitting instructions to the one or more vehicles causing the one or more vehicles to resume performing the one or more missions. In some examples, the method further includes, before retiring the weather advisory, dispatching one or more scout vehicles to verify that the inclement weather has ended. The method may further include tracking, over multiple weather alerts, one or more metrics related to operational weather management of the fleet of autonomous vehicles. Analyzing the weather alert to determine the one or more actions for the one or more vehicles of the fleet of autonomous vehicles to perform may include analyzing the weather alert and the one or more tracked metrics to determine the one or more actions.

In other embodiments, a system for operating a fleet of autonomous vehicles within a geographical region (the fleet of autonomous vehicles performing one or more missions) includes a memory and at least one processor coupled to the memory and configured to receive multiple weather alerts over time. Each of the multiple weather alerts includes a prediction of inclement weather, and each weather alert includes a predicted onset time and a predicted duration of the inclement weather. The at least one processor is further configured to track, over the multiple weather alerts, one or more metrics related to operational weather management of the fleet of autonomous vehicles. For each of the multiple alerts, the processor is further configured to analyze the weather alert and the one or more tracked metrics to determine one or more actions for one or more vehicles of the fleet of autonomous vehicles to perform, wherein the one or more actions include parking in a nearby location in the geographical region or returning to a base of operations. In response to the analysis, the at least one processor is further configured to transmit, to the one or more vehicles of the fleet of autonomous vehicles, a weather advisory, causing each of the one or more vehicles to perform at least one of the one or more actions.

Implementations of the disclosure may include one or more of the following optional features. In some examples, wherein the at least one processor is further configured to, after the predicted duration, dispatch one or more scout vehicles to verify that the inclement weather has ended and, after verifying that the inclement weather has ended, retire the weather advisory by transmitting instructions to the one or more vehicles causing the one or more vehicles to resume performing the one or more missions.

In other embodiments, a non-transitory computer-readable medium is disclosed. The non-transitory computer-readable medium stores instructions that, when executed by at least one computing device, will cause the at least one computing device to perform operations. The operations include operating a fleet of autonomous vehicles within a geographical region, the fleet of autonomous vehicles performing one or more missions. The operations further include receiving a weather alert including a prediction of inclement weather, the weather alert including a predicted onset time and a predicted duration of the inclement weather. The operations further include analyzing the weather alert to determine one or more actions for one or more vehicles of the fleet of autonomous vehicles to perform, wherein the one or more actions include parking in a nearby location in the geographical region or returning to a base of operations. The operations further include, in response to the analysis, transmitting, to the one or more vehicles of the fleet of autonomous vehicles, a weather advisory, causing each of the one or more vehicles to perform at least one of the one or more actions.

Implementations of the disclosure may include one or more of the following optional features. In some examples, the operations further include tracking, over multiple weather alerts, one or more metrics related to operational weather management of the fleet of autonomous vehicles, and analyzing the weather alert to determine the one or more actions for the one or more vehicles of the fleet of autonomous vehicles to perform includes analyzing the weather alert and the one or more tracked metrics to determine the one or more actions. In some examples, the at least one processor is further configured to, after the predicted duration, dispatch one or more scout vehicles to verify that the inclement weather has ended and, after verifying that the inclement weather has ended, retire the weather advisory by transmitting instructions to the one or more vehicles causing the one or more vehicles to resume performing the one or more missions. In some examples, the operations further include tracking, over multiple weather alerts, one or more metrics related to operational weather management of the fleet of autonomous vehicles, and analyzing the weather alert to determine the one or more actions for the one or more vehicles of the fleet of autonomous vehicles to perform includes analyzing the weather alert and the one or more tracked metrics to determine the one or more actions. The operations may further include, after the predicted duration, dispatching one or more scout vehicles to verify that the inclement weather has ended and, after verifying that the inclement weather has ended, retiring the weather advisory by transmitting instructions to the one or more vehicles causing the one or more vehicles to resume performing the one or more missions. In some examples, the analysis includes determining that an onset period until the predicted onset time is less than an onset threshold or that the predicted duration is less than a duration threshold, and transmitting the weather advisory causes each of the one or more vehicles to park in the nearby location. The onset threshold may be based on estimated times for the one or more vehicles to return to the base of operations In some examples, the analysis includes determining that the onset period is not less than the onset threshold and that the predicted duration is not less than the duration threshold, and transmitting the weather advisory causes each of the one or more vehicles to return to the base of operations. In some examples, the weather alert further includes geographical information associated with the prediction of inclement weather, and the analysis is based on the geographical information.

The breadth and scope of this disclosure should not be limited by any of the above-described example embodiments, but should be defined only in accordance with the following claims and their equivalents.

The invention claimed is:

1. A method of managing a fleet of autonomous vehicles, comprising:
   operating a fleet of autonomous vehicles within a geographical region, the fleet of autonomous vehicles performing one or more missions;
   receiving a weather alert comprising a prediction of inclement weather, the weather alert comprising a predicted onset time and a predicted duration of the inclement weather;
   analyzing the weather alert to determine one or more actions for one or more vehicles of the fleet of autonomous vehicles to perform, wherein the one or more actions comprise parking in a nearby location in the geographical region or returning to a base of operations; and
   in response to the analysis, transmitting, to the one or more vehicles of the fleet of autonomous vehicles, a weather advisory, causing each of the one or more vehicles to perform at least one of the one or more actions.

2. The method of claim 1, wherein:
   the analysis comprises determining that an onset period until the predicted onset time is less than an onset threshold or that the predicted duration is less than a duration threshold; and
   transmitting the weather advisory causes each of the one or more vehicles to park in the nearby location.

3. The method of claim 2, wherein the onset threshold is based on estimated times for the one or more vehicles to return to the base of operations.

4. The method of claim 2, wherein:
   the analysis comprises determining that the onset period is not less than the onset threshold and that the predicted duration is not less than the duration threshold; and
   transmitting the weather advisory causes each of the one or more vehicles to return to the base of operations.

5. The method of claim 1, wherein:
   the weather alert further comprises geographical information associated with the prediction of inclement weather; and
   the analysis is based on the geographical information.

6. The method of claim 5, wherein:
   the geographical information comprises a predicted range of the inclement weather; and
   the one or more vehicles comprise vehicles expected to be in the predicted range during the predicted duration of the inclement weather.

7. The method of claim 1, wherein:
   the weather alert further comprises a predicted weather type and/or intensity; and the analysis is based on the predicted weather type and/or intensity.

8. The method of claim 1, wherein the nearby location comprises a designated pickup/drop-off area.

9. The method of claim 1, further comprising, after the predicted duration, retiring the weather advisory by transmitting instructions to the one or more vehicles causing the one or more vehicles to resume performing the one or more missions.

10. The method of claim 9, further comprising, before retiring the weather advisory, dispatching one or more scout vehicles to verify that the inclement weather has ended.

11. The method of claim 9, further comprising tracking, over a plurality of weather alerts, one or more metrics related to operational weather management of the fleet of autonomous vehicles; and
wherein analyzing the weather alert to determine the one or more actions for the one or more vehicles of the fleet of autonomous vehicles to perform comprises analyzing the weather alert and the one or more tracked metrics to determine the one or more actions.

12. A system for operating a fleet of autonomous vehicles within a geographical region, the fleet of autonomous vehicles performing one or more missions, the system comprising:
a memory; and
at least one processor coupled to the memory and configured to:
receive a plurality of weather alerts over time, each of the plurality of weather alerts comprising a prediction of inclement weather, each weather alert comprising a predicted onset time and a predicted duration of the inclement weather;
track, over the plurality of weather alerts, one or more metrics related to operational weather management of the fleet of autonomous vehicles;
for each of the plurality of weather alerts:
analyze the weather alert and the one or more tracked metrics to determine one or more actions for one or more vehicles of the fleet of autonomous vehicles to perform, wherein the one or more actions comprise parking in a nearby location in the geographical region or returning to a base of operations; and
in response to the analysis, transmit, to the one or more vehicles of the fleet of autonomous vehicles, a weather advisory, causing each of the one or more vehicles to perform at least one of the one or more actions.

13. The system of claim 12, wherein the at least one processor is further configured to, after the predicted duration:
dispatch one or more scout vehicles to verify that the inclement weather has ended; and
after verifying that the inclement weather has ended, retire the weather advisory by transmitting instructions to the one or more vehicles causing the one or more vehicles to resume performing the one or more missions.

14. A non-transitory computer-readable medium that stores instructions that, when executed by at least one computing device, will cause the at least one computing device to perform operations comprising:
operating a fleet of autonomous vehicles within a geographical region, the fleet of autonomous vehicles performing one or more missions;
receiving a weather alert comprising a prediction of inclement weather, the weather alert comprising a predicted onset time and a predicted duration of the inclement weather;
analyzing the weather alert to determine one or more actions for one or more vehicles of the fleet of autonomous vehicles to perform, wherein the one or more actions comprise parking in a nearby location in the geographical region or returning to a base of operations; and
in response to the analysis, transmitting, to the one or more vehicles of the fleet of autonomous vehicles, a weather advisory, causing each of the one or more vehicles to perform at least one of the one or more actions.

15. The non-transitory computer-readable medium of claim 14, wherein:
the operations further comprise tracking, over a plurality of weather alerts, one or more metrics related to operational weather management of the fleet of autonomous vehicles; and
analyzing the weather alert to determine the one or more actions for the one or more vehicles of the fleet of autonomous vehicles to perform comprises analyzing the weather alert and the one or more tracked metrics to determine the one or more actions.

16. The non-transitory computer-readable medium of claim 14, wherein the operations further comprise:
after the predicted duration, dispatching one or more scout vehicles to verify that the inclement weather has ended; and
after verifying that the inclement weather has ended, retiring the weather advisory by transmitting instructions to the one or more vehicles causing the one or more vehicles to resume performing the one or more missions.

17. The non-transitory computer-readable medium of claim 14, wherein:
the analysis comprises determining that an onset period until the predicted onset time is less than an onset threshold or that the predicted duration is less than a duration threshold; and
transmitting the weather advisory causes each of the one or more vehicles to park in the nearby location.

18. The non-transitory computer-readable medium of claim 17,
wherein the onset threshold is based on estimated times for the one or more vehicles to return to the base of operations.

19. The non-transitory computer-readable medium of claim 17, wherein:
the analysis comprises determining that the onset period is not less than the onset threshold and that the predicted duration is not less than the duration threshold; and
transmitting the weather advisory causes each of the one or more vehicles to return to the base of operations.

20. The non-transitory computer-readable medium of claim 14, wherein:
the weather alert further comprises geographical information associated with the prediction of inclement weather; and
the analysis is based on the geographical information.

* * * * *